US012649079B2

(12) United States Patent
Joshi et al.

(10) Patent No.: US 12,649,079 B2
(45) Date of Patent: Jun. 9, 2026

(54) COMPOSITION OF FIRE-FIGHTING FOAM CONCENTRATE AND THE METHOD OF MANUFACTURE

(71) Applicants: Hemant N Joshi, Parsippany, NJ (US); Lavanya Kundurthy, Morris Plains, NJ (US); Vaibhav D. Mantri, Meridian, MS (US)

(72) Inventors: Hemant N Joshi, Parsippany, NJ (US); Lavanya Kundurthy, Morris Plains, NJ (US); Vaibhav D. Mantri, Meridian, MS (US)

( * ) Notice: Subject to any disclaimer, the term of this patent is extended or adjusted under 35 U.S.C. 154(b) by 688 days.

(21) Appl. No.: 18/114,757

(22) Filed: Feb. 27, 2023

(65) Prior Publication Data

US 2024/0285991 A1 Aug. 29, 2024

(51) Int. Cl.
*A62D 1/02* (2006.01)
*A62D 1/00* (2006.01)

(52) U.S. Cl.
CPC ........... *A62D 1/0071* (2013.01); *A62D 1/005* (2013.01); *A62D 1/0064* (2013.01)

(58) Field of Classification Search
None
See application file for complete search history.

(56) References Cited

U.S. PATENT DOCUMENTS

| | | | | |
|---|---|---|---|---|
| 7,850,865 | B1 * | 12/2010 | Tucker | F42D 5/045 516/17 |
| 2005/0118106 | A1 * | 6/2005 | Schaefer | A62D 1/0071 514/23 |
| 2017/0273881 | A1 * | 9/2017 | Facheris | A61K 8/36 |
| 2019/0359908 | A1 * | 11/2019 | Ahirwal | C11D 3/222 |
| 2022/0134158 | A1 * | 5/2022 | Havelka-Rivard | A62D 1/0071 252/3 |
| 2022/0355148 | A1 * | 11/2022 | Kasowski | A62D 1/0071 |
| 2022/0362609 | A1 * | 11/2022 | Monfils | A62D 1/0071 |
| 2025/0010117 | A1 * | 1/2025 | Kasowski | A62D 1/0071 |

* cited by examiner

*Primary Examiner* — Joseph D Anthony
(74) *Attorney, Agent, or Firm* — NK Patent Law

(57) ABSTRACT

A fire-fighting composition and method of manufacture of the same has been disclosed herewith. The composition comprises a natural gum, glycol ether, sodium lauryl sulfate, other anionic surfactant(s), non-ionic surfactant(s), and many other propriety components. The resultant composition passed in-house tests—measuring cylinder test, torch test and hot heptane test. The composition does not contain any fluorinated surfactant or compounds. When diluted at 3% concentration, the solution produces satisfactory quantity of foam under pressure to extinguish fire.

20 Claims, No Drawings

COMPOSITION OF FIRE-FIGHTING FOAM CONCENTRATE AND THE METHOD OF MANUFACTURE

This patent application relates to the composition of fire-fighting foam concentrate and the method of manufacture of the same. This application claims a priority benefit to U.S. Provisional Patent Application No. 63/315,582, filed on Mar. 2, 2022. The aforementioned application is incorporated herein in the references.

FIELD OF INVENTION

Background of the Invention

In the United States, the classifications of fire include—Class A (e.g., combustible materials such as wood, paper, fabric, refuse, etc.), Class B (e.g., flammable liquid and gases), Class C (e.g., electrical fires), Class D (e.g., metal fires), and Class K (e.g., cooking oils and fats). Fire-fighting products either extinguish the fire and/or suppress the spread of fire. Most commonly used fire extinguishers contain a mixture of powder comprising of sodium bicarbonate, potassium bicarbonate and ammonium phosphate. The powder must have a good flow property and should not absorb atmospheric moisture during storage. Such powder mixture subsides the flame from the fire.

Fire-fighting foam formulations have been used over many decades. These foams are typically prepared from concentrates by diluting with water and aerating the mixture. The mixture of foam concentrates and water under high pressure is dispensed onto a fire, which forms a thick foam blanket that suffocates and extinguishes a fire by reducing oxygen availability. Prior to 1960s, proteinaceous waste products were used in the formulations. After 1960s, formulations were composed of fluorocarbon surfactants. It was proposed that the fluorocarbon surfactants form an aqueous film under the foam layer that seals off fuel vapors emerging from the pool surface. The aqueous film was attributed to spread on the pool surface because fluorocarbon surfactants reduce the surface tension to an extremely low value. The products, however, pose serious environmental and health hazards. Thus, researchers have been seeking non-fluorinated surfactant in the fire-foam formulations.

In a U.S. Pat. No. 4,020,903, back in 1977, the inventors claimed a method of fighting fires comprising of applying to fire a foam produced from an aqueous composition comprising of surfactants (branched oligomer of tetrafluoroethylene). This is effective along with dry fire extinguishing chemicals (sodium and potassium bicarbonates). The bicarbonates extinguish flames, but reignition is always possible as long as the exposed surface of fuel remains. Foam produced by the aqueous surfactant solution smothers the remaining fuel reducing the chances of reignition. Protein foams are often used. However, they need to be spread in thick, heavy layers as they are easily ruptured. They don't flow easily and therefore; such cracks don't get filled fast. Foams from the fluorine-based surfactants show excellent flow properties and are very stable.

Jho et al. produced (U.S. Pat. No. 5,496,475) low viscosity, concentrated aqueous solutions of polysaccharide gums using anionic copolymers as viscosity reducers. The anionic copolymers contained M1-M2. M1 being acrylic acid, methacrylic acid etc. and M2 are typically acrylamide—methacrilamide, etc.

In 1997, Winkler (U.S. Pat. No. 5,676,876) used short-chained linear alcohol as a suspending solvent, lauric alcohol as a foam stabilizing agent, an acrylic acid polymer to form the foam suspension media, sodium lauryl sulfate as a primary foam producing agent, coco-dimethylamidopropyl betaine as a secondary foam producing agent, water as a diluent, urea as a fire retarding agent, alkaline pH-adjusting agent to get the pH to 7 and sodium carbonate, sodium bicarbonate, potassium acetate or sodium acetate as fire retarding agents.

U.S. Pat. No. 6,527,970 claims a composition for extinguishing fires and bioremediating a fire site comprising a foam-forming surfactant component and a bacterial component comprising a plurality of sporogenous non-pathogenic bacteria species. The composition used at least one fluorinated surfactant. Bacteria are chosen from a group consisting of: *B. subtilis, B. polymyxa, B. licheniformis, B. amyloliquiffaciens, B. pasteuriii* and *B. laevolacticus*. The formulation also contains diethylene glycol n-butyl ether and xanthan gum.

The foam forming compositions are concentrates and are diluted typically to get 3% or 6% solutions prior to use. Usage of such concentrates helps to save space and reduce transportation and storage cost. The foam blanket knocks down the fire and extinguishes it by suffocation. The foams also can form a coat on non-burning volatile liquids, which suppresses vapor formation. Surfactants in the compositions provide low surface tension, high foamability and film-forming properties. The most important properties of the foams formed are—stability, vapor suppression and burn-back resistance. U.S. Pat. No. 7,569,155 used a dark brown sugar, surfactant and water. The sugar is subjected to carbonization during the manufacture of the fire-foam concentrate.

US patent application 20210387033 claimed siloxane and glucoside surfactants in their fire-fighting formulation. In patent application 20210331017, composition comprises a treated, fermented microbial supernatant including bio-nutrients, minerals, and amino acids and one or more nonionic surfactants.

US patent application disclosed fire fighting foams containing deep eutectic solvents (US Patent Application 20190262647). Another invention (US Patent Application 20050118106) provides an aqueous foaming composition, an expanded foam composition and a process of forming a foam composition concentrate. The aqueous foaming composition comprises a carbonized saccharide mixture, a surfactant, water and optionally further agents including thickeners, solvents, stabilizers, buffers, corrosion inhibitors and preservatives. A process for preparing a foam composition including the step of aerating an aqueous diluted solution of a foam forming composition.

U.S. Pat. No. 9,259,602 disclosed a fire fighting foam composition is disclosed comprising water and diutan gum; and either one or more nonionic surfactants with one or more water-miscible organic solvents. Materials were added stepwise, with the mixture maintained at 45° C. The diutan gum was added dissolved in the propylene glycol butyl ether, and the xanthan gum was added dissolved in the butyl di-glycol.

U.S. Pat. No. 10,369,395 added trimethyl glycine as freeze suppressant. The composition also contained anionic, nonionic or zwitterionic surfactants, and an effective amount of foam stabilizing agents.

U.S. Pat. No. 10,463,898 described a method of manufacture of self-expanding fighting foam solution. It contains a pressurizing pressure vessel with an inert gas, filling a foam concentrate into the pressure vessel, filling water into the pressure vessel and mixing the foam concentrate and water. The pH-balancing agent maintains the pH of the formulation between 6.8 and 7.8.

U.S. Pat. No. 11,173,334 described novel poly-organosiloxane compounds, which can be used to make firefighting foams. The purpose was to produce fluorine-free fire suppression foams.

Many fire-fighting foams contain diethylene glycol monobutyl ether (DGME or butyl carbitol or butyl glycol ether). It is used as a foam stabilizer and as a wetting agent. However, it is considered to be relatively toxic with a dermal LD50 in rabbits of only 2.7 g/kg. It is toxic to fish and other aqueous wild-life. US Patent applications 2016/0038778 and 2018/0361185 used polyethylene glycol 400 or less in place of butyl carbitol in fire foam concentrates without compromising desirable properties of butyl carbitol.

Polar-solvent fire-fighting foam concentrates contained perfluroalkyl surfactants, non-fluoro surfactant and water-soluble/swellable polymeric materials. These also contain foam stabilizers and corrosion preventers. Xanthan gum was used at the polysaccharide gum. Fires involving non-polar solvents such as hydrocarbon liquids, the foam producing liquid contains 3% of concentrate and 97% of fresh or salt water. Fires involving polar solvents need 6% dilution (6 parts concentrate and 94 parts water). These were termed as 3×6 design. Later, formulations were modified to make 3×3 design. These require nearly twice as much polysaccharide gum. This helped to reduce storage space, transportation cost and reduced cost of active ingredients. Also, in emergency situations, fire fighters don't have to decide whether to use 3% or 6% of concentrate based on the fire.

US Patent application 20210331017 claimed a composition with fermented microbial supernatant including bio-nutrients, minerals and amino acids and one or more non-ionic surfactants. The one or more nonionic surfactants include one or more alcohol ethoxylate nonionic surfactants, one or more alkylphenol ethoxylate nonionic surfactant, alkene amide nonionic surfactant, or a combination thereof.

There is a need for fluorine-free fire-fighting foams with low environmental impact and easy to manufacture. The goal of this project was to prepare a formulation without using fluorinated surfactants. The formulation would be in the form of a gel and can be considered as a concentrate. Preparation of a fire-foam gel formulation takes a long time, and we intended to develop a simple process of manufacture of our product so that large scale batches can be manufactured in a short time and preferably at room temperature.

SUMMARY OF THE INVENTION

Fire foam concentrate with non-fluorinated surfactants was prepared. The patent also describes the method of manufacture of the large-scale formulation batches, which can be prepared in a short time.

Special attention was given to select ingredients in the fire-foam composition, which as environmentally safe. Also, the fire-fighters using the fire-foam concentrate will not need special protective equipment and will not need special clean-up procedures after the fire is extinguished. The fire-foam concentrate has a near-neutral pH.

The fire-fighting foam contains a unique composition and a simple method of manufacture.

In some embodiments, the fire foam composition contains natural gums such as xanthan gum, guar gum, and diutan gum. One or more gums were added to the formulations. The novelty of the patent is the ease of hydrating these gums. During wetting process, gums tend to form lumps, which are hard to disperse. The gums when wetted with glycol ether, was found to hydrate easily at room temperature, without forming lumps. The two glycol ethers used are—butyl glycol ether (diethylene glycol monobutyl ether, CAS #112-34-5) and ethyl glycol ether (diethylene glycol monoethyl ether, CAS #111-90-0).

In some embodiments, it may contain one or more anionic surfactants. Some commonly used anionic surfactants are—deoxycholic acid, sodium lauryl sulfate, Maypon 4C, sodium trideceth sulfate etc. The surfactants do not limit to this list. Many other anionic surfactants were tested in the formulation compositions.

In certain embodiments, it may contain one or more non-ionic surfactants. Some of the commonly used non-ionic surfactants are Triton X-100, Triton XL 80N, Brij 35, Brij 700, Ethofat 242/25, PEG-80 sorbitan Laurate etc. The surfactants do not limit to this list. Many other non-ionic surfactants were tested in the formulation compositions.

In other embodiments, a mixture of ethyl glycol ether and butyl glycol ethers were used. Ethyl glycol ether produced more viscous gels, but butyl glycol ether helped in the refrigeration test. This combination of glycol ethers is the novelty and differentiates our fire-foam gels from other reported products.

In other embodiments, liquid thickeners such as glycerin, polyethylene glycol 400 and propylene glycol were added to the fire-foam compositions. Formulations may contain one or more liquid thickeners.

In other embodiments, silicone compounds such as Xiameter OFX 5211 fluid. Xiameter PMX 200 Silicone fluid, 2 cSt and 350 cSt, Dowsil OFX 5247 fluid, Dowsil 502 W Additive were added to the fire-foam compositions. The silicone compounds do not limit to this list. Formulations may contain one or more silicone compounds.

In other embodiments, fire-foam compositions contain one or more thickeners, such as starches, synthetic polymeric materials such as polyurethanes, polyvinyl alcohol, cellulose, acrylates etc. Many other polymeric materials may be used too.

In other embodiments, fire-foam compositions may contain one or more chelating agents, such as sodium citrate, EDTA (Ethylenediaminetetraacetic acid).

In another embodiment, fire-foam compositions may contain one or more flocculants, such as polyacrylamide Rheomax, Magnasol, Magnafloc, Drimax and Alclar, Rheomax DR etc.

In some embodiments, fire-foam compositions may contain one or more anti-microbial agents such as sodium benzoate, methyl paraben and propyl paraben. The anti-microbial compounds do not limit to this list.

In other embodiments, fire-foam compositions contain dispersants and cleaning agents. These contain alkyl polyglucoside, alcohol ethoxylates, and anionic alkyl glucoside glucose carboxylates etc.

The fire-foam compositions contain one or more pH balancing agents such as sodium hydroxide, potassium hydroxide, triethanol amine and triethyl amine.

Methods of manufacturing the fire-foam compositions of the present disclosure are also encompassed by this disclosure. In some embodiments, "one-vessel" and "two-vessel" processes were used to manufacture the fire-foam batches. In the "one-vessel" process, all the ingredients were added to one container sequentially. In the "two-vessel" process, the ingredients were divided in two portions and the two phases were added to produce the fire foam concentrate. One vessel contained compounds in an aqueous phase and another vessel contained compounds such as natural gums in the ether phase.

Various in-house tests were developed, which can simulate the commercial tests for Fire-foam products.

Measuring cylinder test—0.3 g of FF gel was weighed in 100 mL measuring cylinder to which 20 mL of tap water was added. The gel was dissolved in the water by gentle shaking first and then shaken vigorously to produce foam. All the liquid transformed to generate foam and the volume of foam was measured. Satisfactory formulations produce at least 50 mL of foam.

Torch test—The stability of foam was tested in the presence of flame produced by a propane tank. The flame can introduce temperature of more than 1000° C. Three grams of FF concentrate was mixed with 100 mL tap water or sea water. The solution was mixed manually to produce foam. The foam and liquid were transferred to a plate with diameter of 10 inch. The foam was exposed to the propane flame and time to break the foam was measured. The flame was rotated in circles and the number of rotations were counted till foam starts to break and open area starts to appear. The foam should be stable up to 20 rotations.

Hot heptane test—Another test was developed to expose the foam to heptane at high temperature and check the stability of foam. We heated pyrex glass container of about 500 mL capacity in an oven at 80° C. About 1 g surfactant was dissolved in 90 mL of warm water (50° C.-60° C.). The solution was shaken to generate foam. The foam and water were poured into the hot pyrex container to which 4 mL of heptane was added. Time to break the foam was measured, which indicated the foam stability in the presence of hot heptane liquid/vapors. The time should be at least 5 minutes to produce more than 10% open area.

According to an embodiment, a fire-fighting foam composition is provided comprising: water, natural gum, one or more anionic surfactants, one or more non-ionic surfactants, glycol ethers, and a pH-balancing agent. The composition may contain suitable polymeric materials, flocculants, dispersants, anti-microbial agents, foam stabilizers and thickeners.

The above summary is not intended to describe each and every disclosed embodiment or every implementation of the disclosure. People working in the field and who are knowledgeable/expert/skilled in the art, will be able to understand and apply these concepts.

DETAILED DESCRIPTION

Definition of Terms Used—

Fire is a result of combustion or burning, in which substances combine chemically with oxygen from the air and typically gives out bright light, heat, and smoke.

As used herein, in the context of a fire, the term "extinguishes" and/or "extinguishing" shall be given its ordinary meaning and can include putting out a fire and/or causing a flame to cease to burn or shine. In some embodiments, extinguishing involves causing a material to stop smoldering.

As used herein, the term "suppress" shall be given its ordinary meaning and can include, preventing, or slowing the spread of fire, preventing or delaying ignition of fire, lowering the temperature of a fire, stopping temperature to increase of a fire, and/or causing a burning material to begin to cool.

As used herein, the term "foam" or "fire-fighting foam" refers to a stable mass of low-density air-filled bubbles. The terms "bubbles" and "foam" can be used interchangeably. The density of these bubbles is lower than the solvent being coated with the foam, and thus, remains on top of the solvent to which the foam is being dispensed. As further described herein, the foams form a homogenous blanket for extinguishing a fire.

Concentrate is a product in which the active ingredients are in high percentages and the product is diluted prior to its actual use.

Surfactant is a substance, which reduces the surface tension of a liquid in which it is dissolved. Surfactants can be anionic, cationic, non-ionic and amphoteric.

HLB values can be used to predict the surfactant properties of a molecule. Table 1 lists the usage of surfactants with different. HLB values.

TABLE 1

HLB values of surfactants and their uses

| HLB value | Surfactant application |
|---|---|
| 1 to 3 | Anti-foaming agents |
| 3 to 6 | Water-in-oil emulsifier |
| 7 to 9 | Wetting and Spreading agent |
| 8 to 16 | Oil-in-water emulsifier |
| 13 to 16 | Detergent |
| 16 to 18 | Solubilizer and Hydrotrope |

A typical surfactant as a polar hydrophilic head and a non-polar (hydrophobic) tail. In a solution form, they can exist as unimers, spherical micelles and cylindrical micelles with hydrophilic end outside, reverse micelles with hydrophobic region outside, and bilayer lamella with hydrophilic end outside.

Foam formation is a very complex and chaotic process. Foam is a dispersion of bubbles in a liquid or gel or in a solid phase. The bubble size is typically between 0.1 to 4 mm in a stable foam (macrobubbles). Bubbles can exist in smaller and larger sizes too. The foam is prepared in two ways—1. Supersaturating the liquid with gas under pressure and then releasing the pressure to produce bubbles. 2. By mechanical means, either by injection of gas through a narrow opening (sparging) or by beating the liquid. Initially, large bubbles are formed, which are slowly converted to smaller bubbles.

Bubbles are inherently unstable. Bubbles break down or grow in size in many ways—1. Smaller bubbles merge with bigger bubbles making them grow bigger. This is called disproportionation or Ostwald ripening. In this, the gas/air from the small bubble injects in the big bubble, thereby merging with the bigger bubble. The rate depends upon the pressure difference between bubbles. It also depends upon the common area of the septum and the diffusivity of the septum. 2. Bubbles, which are distributed throughout the liquid, rise up causing creation of a foam layer. This is also called—creaming. 3. Bubbles deform each other, leading to a polyhedral form. 4. Liquid, surrounding the foam or liquid in between the bubbles, drain down due to gravity breaking the foam surface. 4. Lamellae or a thin membrane between foam bubbles rupture, leading to a coalescence. In coalescence, the two bubbles approach and the liquid in between them drains. The septa of individual bubbles merge. Surfactants play a major role in preventing the breaking of bubbles. A surfactant reduces the surface tension and stabilizes the foam. A surfactant adsorbs on the air-water interface.

Foams are similar to emulsions, but are different. In emulsions, we have a liquid inside the globule (internal phase), which are surrounded by another immiscible liquid to the internal phase (continuous phase). In the foams, bubbles have air or gas inside surrounded by thin film/interface, which in turn is surrounded by a liquid or a solid. The stability of bubbles is governed by the kind of gas in the bubble. Bubbles filled with nitrogen are more stable than the bubbles filled with carbon dioxide. The reason is pointed to the higher solubility of carbon dioxide in the aqueous medium compared to the solubility of nitrogen in water. In both cases—emulsions and foams, we need surfactants residing in the interface. Just as in emulsions, the bubbles of a foam are destabilized by coalescence or Ostwald ripening. There are some differences. The density of an internal phase in an emulsion can be higher or lower compared to the density of the continuous phase and based on that the globules will tend to move down or up, respectively. In foams, however, the density of air is always less than the continuous phase and bubbles tend to move up. Also, as the liquid of the continuous phase in foams is higher than air, the liquid tends to move down due to gravity, which causes draining of liquid or a separation of continuous phase from the bubbles. It is also possible for bubbles to move up. To prevent or reduce the rate of drainage of the continuous phase, one can make it viscous and elastic. Gels can help this process. Gelling agents add stability to the fluid, but should be added in moderation. Another method is to keep the foam moving so that the liquid phase is prevented from draining due to gravity. The rate of foam drainage will depend on many factors such as temperature, viscosity of the liquid phase, and foaming-agent concentration. An increase in temperature can potentially cause a reduction in the viscosity of the fluid. A reduction in continuous phase viscosity helps drainage.

Foam quality (FQ) is the ratio of gas volume to the foam volume over a given pressure and temperature.

$$FQ = \frac{\text{Gas Volume}}{\text{Gas Volume} + \text{Liquid Volume}}$$

Typical FQ is about 65% for wet and 99% for dry foams. The critical gas fraction is about 72%, at which bubbles stop to lose their spherical shape. In a column of foam, the foam in the top region is drier and foam in the bottom region is wetter. When FQ is less than 60%, foam is unstable. When FQ is between 60 to 70%, the liquid between bubbles drains. At FQ over 90%, foams take polyhedral shape. Polyhedral foams can be stable for a long time.

Drainage rate (Q) is inversely proportional to the liquid viscosity. Increase in temperature lowers the viscosity and thereby increasing the rate of drainage. Bubble diameter has a major impact on the drainage rate, $$Q = \frac{d2 \times (Vliquid)2}{W \times (1 - Vliquid \text{ or } Vgas)}$$

$$Q = \text{Flow rate}$$

$$W = \text{viscosity of the liquid draining}$$

$$d = \text{Bubble diameter}$$

$$Vliquid \text{ or } Vgas = \text{Liquid or Gas volume fraction}$$

Elasticity of interface film of the bubble also plays a major role. The film undergoes stretching all the time. It causes a decrease in the surfactant concentration in the stretched region leading to an increase in local surface tension. Elasticity of film depend on the critical micelle concentration of the surfactant. Foam height increases as we increase the surfactant concentration, but plateaus at some point, mostly at CMC. Surfactant with lower CMC produces foam more rapidly and may not necessarily produce less foam.

Another factor is the ionic nature of the surfactants. As the liquid between two bubbles drain, bubbles come closer inducing merging. If the surfactants are ionic in nature, there will be a charge on the foam surface and it will repel the bubbles. For non-ionic surfactants, this is not the case, We observed that it is better to have a mixture of non-ionic and anionic surfactant form a more stable foam.

Organic additives can promote foam formation and stability. Short, unbranched compounds tend to be good cosurfactants.

The initial formulations contained glycol ether, gum, sodium lauryl sulfate and water. It was not easy to hydrate xanthan gum in water to form a gel and glycerin was added to the formula as an aid. Xanthan gum particles, once started to hydrate, agglomerate and form lumps.

One of marketed product reported to contain 10% glycol ether, 1-5% proprietary hydrocarbon surfactant blend, less than 3% xanthan gum and 7% SLS (sodium lauryl sulfate). The specification for pH of the product was 7.0 to 8.5. The viscosity of 3% solution of the product should be 2.4 cps. The viscosity of our diluted product was in the same ball-park range. The key aspects of the fire foam products were—formation of foam, stability of foam and flow of foam. Foam was produced in volumetric flasks on a wrist shaker for our formulation, brand formulation and a proprietary blend of surfactants. The proprietary blend of surfactants produced less foam and the foam broke quickly. It seemed that the glycol ether in our formula helped to stabilize the foam.

We worked on hydrating natural gum, such as xanthan gum, guar gum or diutan gum and invented our own method. We found that if the gum was added to the glycol ether, the particles got coated with the ether. When the aqueous phase was added to the ether phase and mixed, the gum particles did not agglomerate and swelled well to provide a good gel. This method was used in all the future formulations.

Viscosity of batches 15, 16 and 17 was determined using Discovery HR-2 Hybrid Rheometer with a plate method. The viscosity ranged from 42.1 PaS to 47.2 PaS.

The specification for the storage temperatures for the commercial products is 35° F. (2° C.) to 120° F. (49° C.). When our product was stored in the refrigerator, it froze. It was necessary to modify the formula to prevent this freezing of product. The dishwashing liquid does not freeze. It contains non-ionic surfactants. Some of these are fatty acid or fatty alcohol ethoxylated compounds. We prepared 5% surfactant solution in water with 18 different surfactants and froze the solutions at −20° C. for 1 hour. All the samples froze except that for water. We prepared a batch containing glycol ether, xanthan gum, SLS, crodasinic LS 30 (methane amino acetic acid), sodium chloride and water and stored at −20° C. After 2 hrs, the product was solid, less crystals, but did not show any flow. We prepared a fire foam gel formulation and subdivided in 5 g portions. We added 0.2 to 3% of 12 different agents, mixed well and kept the samples in the freezer. After overnight storage, ammonium acetate, glycine, Protameen 200, Procol LA-7, and pine oil were observed to be promising in suppressing the freezing point. It was decided to focus on storage at 2° C. rather than −20° C.

In certain embodiments, it may contain one or more other non-ionic surfactants. Some of the commonly used non-ionic surfactants are Triton X-100, Triton XL 80N, Brij 35, Brij 700, Ethofat 242/25, PEG-80 sorbitan laurate etc. The surfactants tried in our formulations do not limit to this list. Many other non-ionic surfactants were tested in the formulation composition.

We prepared 3 batches as listed in Table 2.

TABLE 2

Composition of Fire-foam batches #24, #25 and #26.

| Ingredient | % | Batch 24 | Batch 25 | Batch 26 |
|---|---|---|---|---|
| Glycol ether | 10 | 10.0081 | 10.0001 | 10.0112 |
| Xanthan gum | 1.5 | 1.5009 | 1.5074 | 1.5019 |
| SLS | 7 | 6.9983 | 7.0069 | 7.0051 |
| Water | 76.5 | 76.4334 | 76.7114 | 76.7659 |
| Protameen 200 DL | 5 | 4.9987 | — | — |
| Procol LA 7 | 5 | — | 4.9998 | — |
| Galsoft GLI 21(F) | 5 | — | — | 4.9967 |

The batches were subdivided and to each fraction, glycine, dimethyl glycine, medium chain glyceride, and ammonium acetate were added. One set was as is. The samples were stored in the refrigerator maintained at 2° C. All the samples with formulation 26 were thick and solid. Glycine and dimethyl glycine showed some promise along with few other excipients. Dimethyl glycine made the pH of formulations very acidic.

Based on the previous batches, FF batch #34 was prepared as per formula in Table 3.

TABLE 3

Composition of Fire Foam batch #34

| Ingredients | % | Actual amount for 50 g |
|---|---|---|
| Glycol ether | 10 | 5.0041 |
| Xanthan gum | 1.0 | 0.4995 |
| Guar gum | 1.0 | 0.5094 |
| SLS | 7.0 | 3.5122 |
| Protameen 200 DL | 0.75 | 0.3836 |
| Procol LA 7 | 2.25 | 1.2273 |
| Glycine | 1.99 | 0.9981 |
| NN-dimethyl glycine | 0.01 | 50 mg |
| Tap water | 76.0 | 40.66 |
| NaOH/HCl to adjust pH to 7 | q.s. | q.s |

q.s.: Quantity sufficient

A 6% solution of batch #34 was prepared. Ten mL of solution was added to a measuring cylinder and shaken well. The foam volume was 50 mL and the foam was stable. Sodium chloride. 352 mg, was added to this solution in the measuring cylinder and shaken well. The foam volume reduced to 32 mL, significantly lower than the foam in tap water.

We prepared new batches with sulfosuccinate sodium, sodium stearate and cocamidopropyl betaine. These gel formulations solidified in the refrigerator. We prepared batches 40, 41 and 42 with the basic formula and protaquat CT-29, Protachem ES-2 and Protasorb L-80, respectively. These batches formed solid particles in the gel, when stored in the refrigerator. A foaming test was developed by adding 50 mL of 6% gel solution in water into a 600-mL beaker. The solution was bubbled with nitrogen under 10 psi. Bubbles were produced in a short time and bubble stability was examined. For batches 18 and 35, the foam was good, but decreased from 600 mL to 150 mL in 10 minutes. The foam for marketed product decreased from 600 mL to 250 mL in 10 minutes. Three waxy surfactants with high HLB values were tried in batches 49, 50 and 51. In one, the foam formed slowly under nitrogen and broke easily. The other two formulations found to be promising. In another batch, an amphoteric surfactant, cocamidopropyl hydroxysultaine, produced satisfactory results.

We also worked on the process based on the properties of surfactants used. For example, Emulcire 61 WL 2659 CG MB could not be dissolved in water. We heated the water to 60° C.-75° C. to aid dissolution. Emulcire 61 WL 2659 showed better results. We prepared batches 58, 59, and 60 with all other ingredients the same and changed only the Emulcire concentrations at 0, 0.25 and 0.5%. We prepared 6% solutions of batches 58 and 60. In the measuring cylinder test, they produced 58 ml and 68 mL foams. After 3 minutes, the drained liquid volumes were 9 mL and 5 mL, respectively. Thus, Emulcire seemed to stabilize the foam. It was hard to dissolve Emulcire in water at room temperature. It needed heating of the aqueous phase to dissolve emulcire. It later batches, it was observed that SLS helped to dissolve other ingredients such as emulcire. Thus, the sequence of addition of ingredients is very important (batches 70 to 72).

We used "one-vessel" and "two-vessel" processes to manufacture fire-foam batches. In the "one-vessel" process, all the ingredients were added to one container sequentially. In the "two-vessel" process, the ingredients were divided in two portions and the two phases were added to produce the fire foam concentrate.

Xanthan gum was used so far in the formulations. It bears carboxylic acid groups. Guar gum is neutral in nature. It is used as a thickening and stabilizing properties in food, and feed. Guar gum is not self-gelling. Borax or calcium ions can cross-link guar gum causing it to gel. Guar gum is not affected by ionic strength and pH. Guar gum is also economical because it has almost eight times the water-thickening ability of other agents (e.g., corn starch) and only a small quantity is needed for producing sufficient viscosity. Guar gum retards ice crystal growth by slowing mass transfer across the solid/liquid interface. It shows good stability during freeze-thaw cycles. Thus, it is used in egg-free ice creams. Guar gum is preferred as a thickener for enhanced oil recovery (EOR). Guar gum and its derivatives account for most of the gelled fracturing fluids. Guar is more water-soluble than other gums, and it is also a better emulsifier, because it has more galactose branch points. Guar gum shows high low-shear viscosity, but it is strongly shear-thinning. Being non-ionic, it is not affected by ionic strength or pH. Thus, guar gum can be replaced xanthan gum partially or fully. Batches 76, 77 and 78 contained 1.6% xanthan gum, 1.4% xanthan gum+0.4% guar gum and 1.5% xanthan gum, respectively. Batch 77 showed small particles under microscope and produced least foam. When stored in the refrigerator overnight, batches without guar gum showed less flowability.

When the 3% fire-foam gel in water is spread over fire under high pressure, the foam extinguishes the fire. However, the foam as well as water spread, gets hot. We developed a method to test the stability of product at higher temperature. We weighed 3 g of fire foam gel (commercial product and Tara's batch #83) in 600 mL beakers. We warmed the water up to 60° C. and added to each sample. Two other samples were prepared by adding 0.33 g of glycerin or PEG 400 in 3 g of batch #83 fire-foam gel. We added 100 mL of hot water to each sample and purged with nitrogen under 10 psi. All produced foam to fill up the beakers. In 10 minutes, the foam levels went down to less than 200 mL. The sample with glycerin showed maximum foam. All the samples were purged with nitrogen again to fill up the beakers. The beakers were stored at 80° C. Samples with glycerin showed most foam stability.

The fire-foam gel products can be stored under cold conditions. It is important to check the physical stability of fire-foam gel when stored at 35° F. or 2° C. We tested all our products in the refrigerator over 2 days. We examined them for the flow property and development of any solids. Many batches such as #92 or #93 showed development of solid granules, which grew over time turning the entire sample to a solid mass. Some batches showed the formation of two layers, top more transparent layer and bottom opaque layer.

Formulations 101 and 102 were prepared using the base formulas. About 100 mg of various surfactants were added to ~1 mL water and 9 g of gel. The surfactant was dissolved in water at RT or by a slight heating. The samples were stored in the refrigerator at 3° C. After an overnight storage, all the samples were examined for their physical state. The samples produced satisfactory gel and when stored at 3° C. in the refrigerator, most of the samples turned solid after refrigeration. We also prepared batches 103 to 108 with different percentages of glycol butyl ether and glycol ethyl ether, increased butyl glycol ether showed increased Phase 2 layer on the top. But butyl glycol ether also improved the foam quality. Ethyl glycol ether made the gel more viscous. Ethyl glycol ether is less toxic compared to butyl glycol ether. It was therefore decided to use the mixture of ethyl and butyl glycol ethers. Acute exposure to high levels of the glycol ethers in human results in narcosis, pulmonary edema, and severe liver and kidney damage. Acute exposure to lower levels of the glycol ethers in humans causes conjunctivitis, upper respiratory tract irritation, headache, nausea, and temporary corneal clouding irritation. In the torch test, we checked the foam formation and foam stability. Optimal butyl glycol ether helped foam formation, but it was reduced at higher butyl glycol ether levels. The foam stability was better when we used the mixture of both ethers. Butyl glycol ether was observed to help prevent solid formation in the formulation at 35° F., but negatively impacted foam properties at higher amounts. We studied the impact of different ratios of butyl glycol ether and ethyl glycol ether on the foam formation and foam stability in the torch test. We compared batches 118A and 118B containing only butyl glycol ether and a mixture of butyl-ethyl glycol ethers, respectively. Batch 118A was very viscous and 118B was a nice gel. The foam produced with batch 118B withstood heat significantly better than 118A in the torch test.

We wanted to check the effect of ethers on foam formation and freezing of foam formulations. Formulations were prepared by slight heating and stirring (Table 4).

TABLE 4

Formulation to examine the effect of glycol ethers on fire-foam properties

| Ingredient | Beaker 1 | Beaker 2 |
|---|---|---|
| Tap water | 8.8460 g | 8.8522 g |
| Butyl ether | 0.5050 g | 0.2084 g |
| Ethyl ether | — | 0.3015 g |
| SLS | 0.7031 g | 0.7016 g |

Expansion of these formulations was measured in 100-mL measuring cylinders. Samples were shaken and foam heights were measured (Table 5).

TABLE 5

Expansion of formulations with different amounts of glycol ethers.

| Time | Beaker 1 | Beaker 2 |
|---|---|---|
| 4 hrs | 10 mL aqueous phase, 10 mL thick foam and 20 mL thin foam | 10 mL aqueous phase, 20 mL thick foam, 40 mL thin foam |

Beaker 2 which contained both butyl and ethyl ether showed more foam, which was more stable Transferred both formulations in vials and stored in the refrigerator. Table 6 lists the effect of storage of formulations in the refrigerator. It seemed that butyl ether was needed to prevent freezing and ethyl ether helped foam formation.

TABLE 6

Effect of glycol ethers on Fire-foam gels.

| Time | Beaker 1 | Beaker 2 |
|---|---|---|
| 2 hrs | Clear | Clear |
| 2.5 hrs | Very slightly cloudy | Turbid |
| 3 hrs | Slight cloudiness | More turbid |

In another test, 3% of batches #94, #96 and #97 in water (total 100 mL) were prepared in flasks. The flasks were shaken to form foam. During commercial testing, the foam is spread over flames produced by burning heptane. Therefore, here, we added heptane to each flask and stored at 80° C. Heating helped to vaporize heptane and vapors interacted with the foam. The foam stability in the presence of heptane was observed for every batch.

In another commercial test, a torch was placed over the foam generated to find out if the foam breaks at high temperature of the flame of the torch. We developed an in-house test. We used Bernzomatic® Propane torch, 400 g. The temperature of the flame has been reported to reach up to 1,500° C. to 2,000° C. We created a 100 mL of 3% fire-foam gel solution and generated foam with vigorous mixing. The foam and the liquid were poured in a plate with diameter 10 inches. Propane torch was used on the foam and examine destruction of foam. This test was also used to test the stability of foam generated by individual surfactants.

Various thickening agents are added to the fire-foam formulations. They increase the viscosity of the product without changing other properties. Some thickeners can be gelling agents. Commonly used thickeners are various kinds of starches (corn, potato, tapioca etc.), gelling agents (alginic acid, carrageenan, gelatin, pectin etc.), flours (rice, wheat, maize etc.), and numerous types of synthetic polymers (polyurethanes, polyvinyl alcohol, cellulose, acrylates etc.). Some of the formulations also contained liquid thickeners such as, glycerin, polyethylene glycol 400 and propylene glycol.

Some embodiments of fire-foam compositions contained silicone compounds—Xiameter OFX 5211 fluid, Xiameter PMX 200 Silicone fluid, 2 cSt and 350 cSt, Dowsil OFX 5247 fluid, and Dowsil 502 W Additive. The list is not limited to only these compounds.

Products within the Carbopol polymer family are chemically similar in that they are all high molecular weight, crosslinked polyacrylic acid polymers.

Carbopol homopolymers: Acrylic acid crosslinked with allyl sucrose or allyl pentaerythritol.

Carbopol copolymers: Acrylic acid and C10-C30 alkyl acrylate crosslinked with allyl pentaerythritol.

Carbopol interpolymers: Carbomer homopolymer or copolymer that contains a block copolymer of polyethylene glycol and a long chain alkyl acid ester.

There are several Carbopol polymers available based on the polymerization solvent, carbomer type and molecular weight (resultant viscosity). For example, Carbopol 974P or Carbomer is carboxypolymethylene. Pemulen TR-2 is a high molecular weight, crosslinked copolymer of acrylic acid and a hydrophobic C10-30 alkyl acrylate co-monomer. Carbopol polymers are easy-to-use liquid thickeners designed to thicken and improve the flow properties in a broad range of product types. As mentioned above, various thickeners such as Carbopol can be used to increase the thickness of liquid residing between foam bubbles.

Effect of chelating agent—The fire foam product is used with any kind of water and some water can be containing high amounts of heavy metals. Chelating agents, such as sodium EDTA, sodium citrate were found to help the fire-foam formulations in generating a stable foam.

Thinners are used to influence mud rheology. These highly effective products avoid the need for mud dilution, which also requires replenishment of mud chemicals and increases mud volume and disposal costs. In addition, once present, thinners will maintain a dispersed drilling fluid rheology, thus protecting against mud gelling or flocculation due to contamination and/or high temperature. Alcomers, Plythin, and Basogan DR 130 are superior products. These are viscofiers, friction reducer and flocculant.

Flocculants, or flocculating agents (also known as flocking agents), are chemicals that promote flocculation by causing colloids and other suspended particles in liquids to aggregate, forming a floc. Particles finer than 0.1 μm in water remain continuously in motion due to electrostatic charge, which causes them to repel each other. Several flocculants can be used. Polyacrylamides are most commonly used flocculants. Polyacrylamide, a linear chain polymer, has the formula (—$CH_2CHCONH_2$—). It is highly water-absorbent, forming a soft gel when hydrated. One of the largest uses for polyacrylamide is to flocculate solids in a liquid. This process applies to water treatment, and processes like paper making and screen printing. Even though these products are often called 'polyacrylamide', many are actually copolymers of acrylamide and one or more other species, such as an acrylic acid or a salt thereof. These copolymers have modified wetting and swellability. The ionic forms of polyacrylamide have found an important role in the potable water treatment industry. Trivalent metal salts, like ferric chloride and aluminum chloride, are bridged by the long polymer chains of polyacrylamide. This results in significant enhancement of the flocculation rate. This allows water treatment plants to greatly improve the removal of total organic content (TOC) from raw water. In oil and gas industry polyacrylamide derivatives especially, co-polymers have a substantial effect on production by enhanced oil recovery by viscosity enhancement. High viscosity aqueous solutions can be generated with low concentrations of polyacrylamide polymers, which are injected to improve the economics of conventional water-flooding. Considering the volume of polyacrylamide produced, these materials have been heavily scrutinized with regards to environmental and health impacts. Polyacrylamide is of low toxicity but its precursor acrylamide is a neurotoxin and carcinogen. It was established that polyacrylamide had the highest stabilizing effect on fire-fighting foams. Foam agents with polyacrylamide additives provide for 5 times decrease of extinguishment period of flammable liquids compared to extinguishment period without polyacrylamide additives.

There are several flocculants commercially available. These could be Rheomax, Magnasol, Magnafloc, Drimax and Alclar, Rheomax DR are high performance flocculants. Rheomax® DR is the advanced range of chemical aids for gravity based solid liquid separation processes, offering superior flocculating performance compared to conventional benchmark flocculants. Rheomax® DR is effective for many different kinds of ores, creating more robust aggregates. The flocculated particle structure improves compression and dewatering characteristics to give substantially higher underflow densities without compromising yield stress. The flocculants were discovered to stabilize foam, but the exact mechanism is unknown at this stage. Two flocculants were added to batch 122 and the foam generated was tested in the torch test. Both produced slimy soap solutions and the foam was significantly more stable in the torch test. Two new batches, #123 and @124 were prepared using these agents. One agent produced better results than the other as observed before.

So far, tap water supplied by the city was used in the formulations. We opted to try sea water for dilution. The salt mixture for producing sea water contains the following ingredients. Table 7 lists the composition of "Sea-Salt", ASTM D 1141-98.

TABLE 7

Composition of Sea-salt, ASTM D 1141-98

| Ingredient | Percentage |
|---|---|
| Sodium chloride | 58.490 |
| Magnesium chloride, hexahydrate | 26.460 |
| Sodium sulfate | 9.750 |
| Calcium chloride | 2.765 |
| Potassium chloride | 1.645 |
| Sodium bicarbonate | 0.477 |
| Potassium bromide | 0.238 |
| Boric acid | 0.071 |
| Strontium chloride hexahydrate | 0.095 |
| Sodium fluoride | 0.007 |

The density of sea water has been reported to be 1.025 g/mL at 15° C.

Batches #136-138, produced less foam in sea water compared to the foam produced in the tap water. Same phenomenon was observed for the commercial products. In the torch test, the foam produced in sea water also broke earlier compared to the foam produced in the tap water.

A dispersant or a dispersing agent is a substance, typically a surfactant, is added to suspend solid or liquid particles in a liquid (such as a colloid or emulsion) to improve the separation of the particles and to prevent their settling or clumping. Detergents are used in laundry detergents to encase dirt and grime. Dispersants and cleaning agents can be useful while using sea water as a diluent. These contain alkyl polyglucoside, Alcohol ethoxylates, and anionic alkyl glucoside glucose carboxylates. In oil and gas production, the application of cleaning agents in areas such as equipment maintenance, tank cleaning, wellbore cleaning and water injection systems clean-up, is important for the success of operations. BASFs Basoclean, Basosol, and Basopon product lines are effective in these applications. These surfactants are often utilized best in multicomponent blends, especially in oil-field applications where challenging variables such as temperature, electrolyte concentration, hydrocarbon environments, and the presence of suspended solids can affect the performance of surfactants. Agnique DDL is a blend of alkyl polyglucoside and lignosulfonate. It is an excellent dispersing, wetting and biding agent. Alkyl glucosides are a class of non-ionic surfactants consisting of glucose derivative and fatty alcohols. It enhances the formation of foam in detergents. These are biodegradable and safe for sensitive skin.

Batch #146 was prepared with glycol ethers, xanthan gum and anionic surfactant and tap water. Various new surfactants were added in fractions of this batch and the gels were diluted with tap water. The foam produced was exposed to torch test. No surfactant tested was selected further.

Batches #146-#149 were prepared and showed good foam stability in tap water and sea water.

In one of the tests, foam was used to extinguish heptane fire and the foam stability over heptane was examined. The foam produced from any fire-foam product needed to be examined over heptane. An in-house test was developed to test the surfactants used in the formulations. Added 5% surfactant in water, i.e., 1 g surfactant in 20 mL water in a 100-mL measuring cylinder. The cylinder was shaken vigorously to produce foam. The foam height was measured. Two mL of heptane was added to the cylinder and the cylinder was closed with a stopper. Table 8 lists the results of this test for various ingredients.

TABLE 8

Foam stability in tap water and heptane.

| Ingredient | Foam height, mL | | | Foam height after reshaking with heptane, mL | |
|---|---|---|---|---|---|
| | 0 time | 5 min | 10 min | 0 time | 10 min |
| #1 | 110 | 53 | 43 | 103 | 63 |
| #2 | 98 | 12 | 8 | 92 | 9 |
| #3 | 115 | 39 | 35 | 110 | 23 |
| #4 | No foam | — | — | — | — |
| #5 | 100 | 15 | 13 | 80 | 12 |
| #6 | No foam | — | — | — | — |
| #7 | 105 | 32 | 22 | 100 | 55 |
| #8 | 27 | 10 | 9 | 25 | 15 |
| #9 | 56 | 11 | 7 | 30 | 26 |
| #10 | 80 | 25 | 18 | 73 | 60 |

The same experiment was repeated with sea water (Table).

TABLE 9

Foam stability in sea-water and heptane.

| Ingredient | Foam height, mL | | | Foam height after reshaking with heptane, mL | |
|---|---|---|---|---|---|
| | 0 time | 5 min | 10 min | 0 time | 10 min |
| #1 | 85 | 1 | 0 | 50 | 7 |
| #2 | 88 | 7 | 2 | 70 | 18 |
| #3 | 115 | 0 | — | 75 | 5 |
| #7 | 90 | 0 | — | 80 | 5 |

As the fire foam products would be used in open environment outside, the effect of wind on foam stability was examined. Gel, 3 g, was dissolved in 100 mL water and foam was produced by shaking the contents were poured into a plate containing two mL heptane. The foam was stable up to 40 minutes. A fan was started about 5 feet away from the plate and in couple of minutes, the foam from one side started to break. Fan was stopped. Foam in the remaining area covered the open area. Thus, wind has a negative impact on foam stability.

In another experiment, foam was created in hot tap water at about 43-45° C. and poured over heptane in a plate. The foam broke much earlier suggesting the effect of temperature on foam stability in the presence of heptane. Similar experiment was conducted using warm sea water and foam thinned.

We modified the principle to come up with a new test. We heated pyrex glass container of about 500 mL capacity in an oven at 80° C. About 1 g surfactant was dissolved in warm water (50° C.-60° C.). The solution was shaken to generate foam. The foam and water were poured into the hot pyrex container to which 4 mL of heptane was added. Various surfactants and fire-foam batches were tested using this method. This helped us determine the foam formulation in which surfactants were stable in the presence of hot heptane. We also compared our product with the commercial products using the test. We decided to understand the interaction between different ingredients with heptane at room temperature. Many oils such as sesame oil, oleic acid dissolved immediately. We could identify surfactants dissolving in heptane and surfactants insoluble in heptane. If the surfactants in the foam film dissolves in the heptane or heptane vapor, it will break the foam immediately. Thus, we need surfactants in the formula, which would not dissolve in heptane. Several polymeric materials were tested for their solubility in heptane. Most of them did not dissolve in heptane. Thus, it was a novel finding suggesting polymeric materials could be stabilizing foam in the presence of heptane. In the actual testing, fire from the burning heptane is extinguished using the fire foam. The foam in contact with hot heptane should not break easily. Heptane is very volatile. It may be better if we use an agent in the fire foam, which will interact with heptane and reduce its evaporation rate. Batch 151 was mixed with various polymeric materials at 2% level and the hot pyrex test as mentioned above was conducted. We could select polymeric materials, which helped to stabilize the foam in the presence of hot heptane.

We prepared a batch #153 with all other normally used ingredients and subdivided the batch in 6 fractions. We added 2% six polymeric materials. Some polymeric materials imparted acidity and we had to add sodium hydroxide to adjust the pH to about 7 to 8. The samples were first stored in the refrigerator at 35° C. overnight. None of the fractions froze and indicated satisfactory fluidity. We tested the fraction batches with hot pyrex test and examined the stability of foam in the presence of hot heptane.

Based on all the work completed so far, we could come up with formulations, which would satisfy all our requirements.

A typical effective base formulation according to an embodiment of the present invention is (Table 10):

TABLE 10

A typical effective base formulation of a fire-foam product.

| Ingredient | Percent |
|---|---|
| Butyl glycol ether | 0.1 to 10% |
| Ethyl glycol ether | 0.1 to 10% |
| Xanthan gum | 0.1 to 4% |
| Guar gum | 0.1 to 4% |
| Sodium lauryl sulfate | 2 to 10% |
| Cocamidopropyl betaine | 0.1 to 5% |
| Glycerin | 1 to 10% |
| Tap water | q.s. to 100% |
| Sodium hydroxide | q.s. to pH 6.5 to 8.5 |

q.s. - quantity sufficient

We used the following general procedure for the above example or some of the other batches. We used a "two-vessel" method in this formulation. We suspended xanthan gum and guar gum in the mixture of butyl glycol ether and ethyl glycol ether. In another "vessel", glycerin and surfactants were dissolved in tap water and the pH was adjusted to the desired value. The "aqueous" phase was then added to the "ether" phase with constant mixing. The gums hydrates forming a nice gel.

The base formula was used to prepare compositions with various surfactants, and other ingredients, such as thickening agents, polymeric materials, flocculant materials, dispersants, antimicrobial agents, chelating agents etc. The formulations may contain primary foaming agents and secondary foaming agents. Table 11 lists the composition of Example 1.

TABLE 11

Example 1 composition.

| Ingredient | Percent |
|---|---|
| Butyl glycol ether | 0.1 to 10% |
| Ethyl glycol ether | 0.1 to 10% |
| Xanthan gum | 0.1 to 4% |
| Sodium lauryl sulfate | 1 to 10% |
| Cocamidopropyl betaine | 0.1 to 5% |
| Anionic surfactant(s) | 0.1 to 10% |
| Non-anionic surfactant(s) | 0.1 to 10% |
| Glycerin | 0.1 to 10% |
| Polymeric material(s) | 0.01 to 5% |
| Dispersant(s) | 0.01 to 5% |
| Sodium benzoate | 0.1 to 1% |
| Tap water | q.s. to 100% |
| Sodium hydroxide | q.s. to pH 6.5 to 8.5 |

q.s. - quantity sufficient

The product was prepared using a "two-vessel" method as described above. Table 12 lists the composition of Example 2.

TABLE 12

Example 2 composition.

| Ingredient | Percent |
|---|---|
| Butyl glycol ether | 0.1 to 10% |
| Ethyl glycol ether | 0.1 to 10% |
| Xanthan gum | 0.1 to 4% |
| Guar gum | 0.1 to 4% |
| Sodium lauryl sulfate | 1 to 10% |
| Cocamidopropyl betaine | 0.1 to 5% |
| Anionic surfactant(s) | 0.1 to 10% |
| Non-ionic surfactant(s) | 0.1 to 10% |
| PEG 400 | 0.1 to 10% |
| Flocculant material(s) | 0.01 to 5% |
| Dispersant(s) | 0.01 to 5% |
| EDTA, sodium salt | 0.1 to 2% |
| Tap water | q.s. to 100% |
| Sodium hydroxide | q.s. to pH 6.5 to 8.5 |

q.s. - quantity sufficient

A preferred specific formulation according one embodiment of the present invention is presented in Table 13.

TABLE 13

General fire-foam composition, Example 3.

| Ingredient | Percent |
|---|---|
| Butyl glycol ether<br>Ethyl glycol ether | Total 1 to 20 |
| Natural gum | 0 to 8 |
| Anionic surfactant | 0.1 to 10 |
| Non-ionic surfactant | 0.1 to 10 |
| Thickening agent | 0.01 to 5 |
| Polymeric material | 0.01 to 5 |
| Flocculant material | 0.01 to 5 |
| Dispersant | 0.01 to 5 |
| Tap water | q.s. to 100 |
| Sodium hydroxide | q.s. to final product pH 6.5 to 8.6 |

q.s. - quantity sufficient

CONCLUDING REMARKS

The present specification discloses the materials used in developing a fire-foam concentrate formula and the procedures used to prepare the same. In accordance with the invention, an improved fire-foam concentrate formula and an improved method of making the same has been provided. These satisfied the objectives of the project set forth above. The present disclosure comprises the following aspects/embodiments/features in any order and/or in any combination.

A fluorine-free firefighting foam concentrate composition comprising: (a) one or more glycol ether; (b) one or more natural gum; (c) one or more anionic surfactant; (d) one or more non-ionic surfactant; (e) water quantity sufficient to make 100%; (f) a pH-balancing agent; (g) thickening agent (s); (h) polymeric material(s); (i) flocculant material(s); (j) dispersant material(s); one or more additional components dissolved or dispersed and the formulation is prepared using the two-vessel method wherein the natural gum is suspended in the glycol ether phase before hydration.

A fluorine-free firefighting foam concentrate composition, wherein the glycol ethers are diethylene glycol monobutyl ether, diethylene glycol monoethyl ether or combination thereof.

A fluorine-free firefighting foam concentrate composition, wherein the individual glycol ether concentration is from about 0.1% to 10%.

A fluorine-free firefighting foam concentrate composition, wherein the glycol ethers are xanthan gum, guar gum, diutan gum or combination thereof.

A fluorine-free firefighting foam concentrate composition of, wherein the individual natural gum concentration is from about 0.1% to 4%.

A fluorine-free firefighting foam concentrate composition, wherein one of the anionic surfactants is sodium lauryl sulfate.

A fluorine-free firefighting foam concentrate composition, wherein the individual anionic surfactant concentration is from about 0.1% to 10%.

A fluorine-free firefighting foam concentrate composition, wherein the individual non-anionic surfactant concentration is from about 0.01% to 5%.

A fluorine-free firefighting foam concentrate composition, wherein water can be tap water or sea water.

A fluorine-free firefighting foam concentrate composition, wherein the individual thickening agent concentration is from about 0.01% to 5%.

A fluorine-free firefighting foam concentrate composition, wherein the individual polymeric material concentration is from about 0.01% to 5%.

A fluorine-free firefighting foam concentrate composition, wherein the individual flocculant material concentration is from about 0.01% to 5%.

A fluorine-free firefighting foam concentrate composition of wherein the individual dispersant material concentration is from about 0.1% to 10%.

A fluorine-free firefighting foam concentrate composition, wherein the additional materials may be chelating agent, stabilizer, anti-microbial agent, corrosion inhibitor, and preservative.

A fluorine-free firefighting foam concentrate composition, wherein the concentrate composition is formulated to a diluted form at 1%, 3% and 6% with tap water or sea water prior to spraying under pressure to form foam.

A fluorine-free firefighting foam concentrate composition comprising: (a) one or more glycol ether; (b) one or more natural gum; (c) one or more anionic surfactant; (d) one or more non-ionic surfactant; (e) water quantity sufficient to make 100%; (f) a pH-balancing agent; (g) thickening agent (s); (h) polymeric material(s); (i) flocculant material(s); one or more additional components dissolved or dispersed and the formulation is prepared using the two-vessel method wherein the natural gum is suspended in the glycol ether phase before hydration.

A fluorine-free firefighting foam concentrate composition, wherein the concentrate composition is formulated to a diluted form at 1%, 3% and 6% with tap water or sea water prior to spraying under pressure to form foam.

A fluorine-free firefighting foam concentrate composition comprising: (a) one or more glycol ether; (b) one or more natural gum; (c) one or more anionic surfactant; (d) one or more non-ionic surfactant; (e) water quantity sufficient to make 100%; (P) a pH-balancing agent; (g) thickening agent (s); (h) polymeric material(s); (i) dispersant material(s); one or more additional components dissolved or dispersed and the formulation is prepared using the two-vessel method wherein the natural gum is suspended in the glycol ether phase before hydration.

A fluorine-free firefighting foam concentrate composition, wherein the concentrate composition is formulated to a diluted form at 1%, 3% and 6% with tap water or sea water prior to spraying under pressure to form foam.

The above summary is not intended to describe each and every disclosed embodiment or every implementation of the disclosure. People working in the field and who are knowledgeable/expert/skilled in the art, will be able to understand and apply these concepts.

REFERENCES

1. R. Ananth, A. W. Snow, K. Hinnant, S. L. Giles; Siloxane and Glucoside surfactant formulation for fire-fighting foam applications; U.S. Patent Application 20210387033; Dec. 16, 2021.
2. P. D. Dale, and J. Johnston; Non-toxic fire extinguishing compositions. Devices and methods of using same; U.S. Patent application 20210331017; Oct. 28, 2021.
3. P. Havelka-Rivard, S. A. Barker, and M. A. C. Siem; Fire-fighting foam compositions containing deep surfactant solvents; U.S. Patent Application 20190262647; Aug. 29, 2019.
4. T. H. Schaefer: Aqueous Foaming compositions, US Patent Application 20050118106, 2005.
5. T. H. Schaefer; Aqueous Foaming composition; U.S. Pat. No. 7,569,155; Aug. 2, 2009.
6. N. E. Robinet and C. Smett; Fire fighting foam composition and method of use; U.S. Pat. No. 9,259,602; Feb. 26, 2016.
7. A. C. S. Mark; Low molecular weight polyethylene glycol in fluorine containing fire fighting foam concentrate; U.S. Patent #2016/0038778; February 2016.
8. M. Adam-Christopher Siem; Low molecular weight polyethylene glycol (PEG) in fluorine containing fire fighting foam concentrate; U.S. Patent #2018/0361185; February 2018.
9. Y. Xie, A. J. Wirth, and P. J. Karjala; Polyorganosiloxane compounds as active ingredients in fluorine free fire suppression foams; U.S. Pat. No. 11,173,334; Nov. 16, 2021.
10. M. E. Brown, M. Adam-Chrostopher Siem, and S. A. Barker; Trimethylglycine as freeze suppressant in fire fighting foams; U.S. Pat. No. 10,369,395; Aug. 6, 2019
11. H. C. Fielding, J. Hutchinson, and S. J. Webster; Firefighting foam compositions; U.S. Pat. No. 4,020,903; May 3, 1977.
12. C. H. Jho, Y. Loh, and K. F. Mueller; Low viscosity polar-solvent fire-fighting foam compositions; U.S. Pat. No. 5,496,475; Mar. 5, 1996.
13. J. D. Plessis; Expandable fire-fighting foam system, composition, and method of manufacture; U.S. Pat. No. 10,463,898; Nov. 5, 2019.
14. W. L. Scogin, and C. S. Cox; Microbiological aqueous film forming foam (AFFF) fire-fighting formulation; U.S. Pat. No. 6,527,970; Mar. 4, 2003.
15. J. A. Winkler, III: Fire fighting foam and method; U.S. Pat. No. 5,676,876; Oct. 14, 1997.
16. H. N. Joshi, L. Kundurthy, and V. Mantri; Composition of fire-fighting foam concentrate and the method of manufacture; U.S. Provisional patent application No. 63/315, 582, filed on Mar. 2, 2022.

What is claimed is:

1. A fluorine-free firefighting foam concentrate composition comprising:

(a) a plurality of glycol ethers, wherein the plurality of glycol ethers includes at least one butyl glycol ether and at least one ethyl glycol ether;

(b) one or more natural gums, providing stabilization and thickening to the foam concentrate composition;

(c) one or more anionic surfactants;

(d) one or more non-ionic surfactants;

(e) one or more amphoteric surfactants, wherein the one or more amphoteric surfactants include cocamidopropyl hydroxysultaine and/or cocamidopropyl betaine;

(f) water;

(g) one or more additional polymeric materials, wherein the one or more additional polymeric materials include polyurethane, polyvinyl alcohol, and/or cellulose;

(h) one or more polyacrylamides, acting as flocculating agents;

(i) one or more additional chelating agents, anti-microbial agents, corrosion inhibitors, and/or preservatives;

wherein the formulation is prepared using a two-vessel method such that the one or more natural gums are suspended in the plurality of glycol ethers before hydration.

2. The fluorine-free firefighting foam concentrate composition of claim 1, wherein the at least one butyl glycol ether includes diethylene glycol monobutyl ether and wherein the at least one ethyl glycol ether includes diethylene glycol monoethyl ether.

3. The fluorine-free firefighting foam concentrate composition of claim 1, wherein the plurality of glycol ethers each have a concentration between from about 0.1% to 10% by mass.

4. The fluorine-free firefighting foam concentrate composition of claim 1, wherein the one or more natural gums include xanthan gum, guar gum, diutan gum or combinations thereof.

5. The fluorine-free firefighting foam concentrate composition of claim 1, wherein the one or more natural gums each have a concentration between about 0.1% to 4% by mass.

6. The fluorine-free firefighting foam concentrate composition of claim 1, wherein the one or more anionic surfactants include sodium lauryl sulfate.

7. The fluorine-free firefighting foam concentrate composition of claim 1, wherein the one or more anionic surfactants have a concentration between about 0.1% to 10% by mass.

8. The fluorine-free firefighting foam concentrate composition of claim 1, wherein the one or more non-ionic surfactants have a concentration between about 0.01% to 5% by mass.

9. The fluorine-free firefighting foam concentrate composition of claim 1, wherein the water includes tap water or sea water.

10. The fluorine-free firefighting foam concentrate composition of claim 1, further including one or more additional thickening agents, wherein the one or more additional thickening agents include glycerin.

11. The fluorine-free firefighting foam concentrate composition of claim 1, wherein the one or more additional polymeric materials each have a concentration between about 0.01% to 5% by mass.

12. The fluorine-free firefighting foam concentrate composition of claim 1, wherein the one or more polyacrylamides have a concentration between about 0.01% to 5% by mass.

13. The fluorine-free firefighting foam concentrate composition of claim 1, wherein the concentrate composition is formulated to a diluted form at 1%, 3% and 6% with tap water or sea water prior to spraying under pressure to form foam.

14. A fluorine-free firefighting foam concentrate composition comprising:
- (a) a plurality of glycol ethers, wherein the plurality of glycol ethers includes at least one butyl glycol ether and at least one ethyl glycol ether;
- (b) one or more natural gums, providing stabilization and thickening to the foam concentrate composition;
- (c) one or more anionic surfactants;
- (d) one or more non-ionic surfactants;
- (e) water;
- (f) a pH-balancing agent;
- (g) one or more additional thickening agents, wherein the one or more additional thickening agents include glycerin; and
- (h) one or more additional polymeric materials, wherein the one or more additional polymeric materials include polyurethane, polyvinyl alcohol, and/or cellulose;
- (i) one or more anionic polyacrylamides, acting as flocculating agents;
- (j) one or more additional chelating agents, anti-microbial agents, corrosion inhibitors, and/or preservatives;

wherein the formulation is prepared using a two-vessel method such that the one or more natural gums are suspended in the plurality of glycol ethers before hydration.

15. The fluorine-free firefighting foam concentrate composition of claim 14, the concentrate composition is formulated to a diluted form at 1%, 3% and 6% with tap water or sea water prior to spraying under pressure to form foam.

16. A fluorine-free firefighting foam concentrate composition comprising:
- (a) a plurality of glycol ethers, wherein the plurality of glycol ethers includes at least one butyl glycol ether and at least one ethyl glycol ether;
- (b) a plurality of natural gums, providing stabilization and thickening to the foam concentrate composition, wherein the plurality of natural gums includes xanthan gum and guar gum;
- (c) one or more anionic surfactants, wherein the one or more anionic surfactants include sodium lauryl sulfate;
- (d) one or more non-ionic surfactants;
- (e) one or more amphoteric surfactants, wherein the one or more amphoteric surfactants include cocamidopropyl hydroxysultaine and/or cocamidopropyl betaine; and
- (f) water;
- (g) one or more additional thickening agents, wherein the one or more additional thickening agents include glycerin;
- (h) one or more additional polymeric materials, wherein the one or more additional polymeric materials include polyurethane, polyvinyl alcohol, and/or cellulose;
- (i) one or more additional chelating agents, anti-microbial agents, corrosion inhibitors, and/or preservatives;

wherein the formulation is prepared using a two-vessel method such that the one or more natural gums are suspended in the plurality of glycol ethers before hydration.

17. The fluorine-free firefighting foam concentrate composition of claim 16, the concentrate composition is formulated to a diluted form at 1%, 3% and 6% with tap water or sea water prior to spraying under pressure to form foam.

18. The fluorine-free firefighting foam concentrate composition of claim 16, wherein the water includes tap water or sea water.

19. The fluorine-free firefighting foam concentrate composition of claim 16, wherein the plurality of glycol ethers each have a concentration between from about 0.1% to 10% by mass.

20. The fluorine-free firefighting foam concentrate composition of claim 16, wherein the one or more natural gums each have a concentration between about 0.1% to 4% by mass.

* * * * *